(12) United States Patent
Zhang et al.

(10) Patent No.: US 12,445,754 B2
(45) Date of Patent: Oct. 14, 2025

(54) MICROWAVE PHOTON FREQUENCY SYNTHESIS SYSTEM AND METHOD

(71) Applicant: CHINA ELECTRONICS TECHNOLOGY GROUP CORPORATION NO.44 RESEARCH INSTITUTE, Chongqing (CN)

(72) Inventors: Hao Zhang, Chongqing (CN); Xuan Li, Chongqing (CN); Maoxu Wang, Chongqing (CN); Yongchuan Xiao, Chongqing (CN); Yu Zhang, Chongqing (CN)

(73) Assignee: CHINA ELECTRONICS TECHNOLOGY GROUP CORPORATION NO. 44 RESEARCH INSTITUTE, Chongqing (CN)

( * ) Notice: Subject to any disclaimer, the term of this patent is extended or adjusted under 35 U.S.C. 154(b) by 246 days.

(21) Appl. No.: 18/468,734

(22) Filed: Sep. 17, 2023

(65) Prior Publication Data

US 2024/0107204 A1 Mar. 28, 2024

Related U.S. Application Data

(63) Continuation of application No. PCT/CN2022/143777, filed on Dec. 30, 2022.

(30) Foreign Application Priority Data

Sep. 26, 2022 (CN) .......................... 202211176270.9

(51) Int. Cl.
*H04Q 11/00* (2006.01)
*H04B 10/548* (2013.01)

(52) U.S. Cl.
CPC ....... *H04Q 11/0005* (2013.01); *H04B 10/548* (2013.01); *H04B 2210/006* (2013.01);
(Continued)

(58) Field of Classification Search
CPC ............ H04B 10/548; H04B 2210/006; H04Q 11/0005; H04Q 2011/0007; H04Q 2011/0041; H04Q 2011/005
See application file for complete search history.

(56) References Cited

U.S. PATENT DOCUMENTS 10,763,969 B2 * 9/2020 Kim ..................... H04B 10/524
11,581,946 B2 * 2/2023 El Amili ................ H01S 5/0623
(Continued)

FOREIGN PATENT DOCUMENTS

CN 105141373 A * 12/2015 ........... H04B 10/548
CN 110943362 A * 3/2020 ......... H01S 3/10053

*Primary Examiner* — Daniel Petkovsek (57) ABSTRACT

The disclosure provides a microwave photon frequency synthesis system and method. In the disclosure, based on various combinations of path switching options of optical routing modules and electrical routing modules, the microwave photon frequency synthesis system is provided with a direct photoelectric conversion mode, an electrical frequency synthesis mode and an optical amplitude and phase control mode. The first optical signal frequency selection based on the optical frequency comb module and the frequency multiplication/division selection of the optical frequency multiplication/division module can be freely combined to realize frequency sources of various frequencies. Based on the optical frequency comb module to generate the first optical signal, and then combined with an electrical filtering module, phase noise can be reduced. The optical amplitude and phase may be controlled by the optical amplitude and phase control module.

14 Claims, 4 Drawing Sheets

(52) U.S. Cl.
CPC ............... *H04Q 2011/0007* (2013.01); *H04Q 2011/0041* (2013.01); *H04Q 2011/005* (2013.01)

(56) References Cited

U.S. PATENT DOCUMENTS

| | | | |
|---|---|---|---|
| 11,736,203 B1* | 8/2023 | Esman | H04B 10/613 398/43 |
| 11,984,894 B2* | 5/2024 | Zhang | H03K 5/1252 |
| 12,057,849 B2* | 8/2024 | Zhang | H03B 17/00 |

* cited by examiner

MICROWAVE PHOTON FREQUENCY SYNTHESIS SYSTEM AND METHOD

CROSS REFERENCE TO RELATED APPLICATION

The present application is a Continuation Application of PCT application No. PCT/CN2022/143777 filed on Dec. 30, 2022, which claims the benefit of CN202211176270.9 filed on Sep. 26, 2022. All the above are hereby incorporated by reference.

TECHNICAL FIELD

The disclosure relates to a technical field of microwave photon frequency synthesis, in particular to a microwave photon frequency synthesis system and method.

BACKGROUND

Frequency synthesis is an enabling technology for radar, satellite and ground communications, position sensing, navigation technologies, and many core defense capabilities. With the development needs of bottleneck breakthrough and upgrading of electronic information system, ultra-low phase noise and ultra-wideband frequency synthesizer has become one of the important fields and directions of frequency synthesis technology development, and with the miniaturization of electronic systems and the demand for higher performance, higher requirements are put forward for the design of frequency synthesizers for miniaturization, frequency agility, fine stepping, low spurious, and low phase noise.

In traditional microwave frequency synthesis technology, quartz crystals and dielectric resonant cavities are used to form microwave oscillators to generate low phase noise local oscillator signals. Wherein, although the phase noise of the quartz oscillator may reach −160 dBc/Hz or even lower when the frequency deviation is 10 kHz, its output frequency is only tens of MHz; at the same time, the Q value of the dielectric resonant cavity decreases linearly with the increase of the output frequency. Therefore, in order to obtain microwave signals with higher-frequency, electrical frequency multiplication is required, but the phase noise will deteriorate logarithmically by 20 times during electrical frequency multiplication, the traditional microwave frequency synthesis technology can no longer meet the requirements of the next generation of electronic information system for high frequency, high stability, and low phase noise frequency signals.

In addition, with the rapid development of microwave photonics technology, the technology of X-band microwave signal generation based on optoelectronic oscillator may realize the phase noise of −163 dBc/Hz@10 kHz, and the technology of X-band signal generation based on optical frequency comb has realized the phase noise far better than −170 dBc/Hz. However, in the above-mentioned microwave photon frequency synthesis technology, due to the limitation of the tuning mechanism, the phase noise and stability of the generated microwave are far behind the traditional microwave frequency synthesis technology, and still cannot meet the requirements of the next generation of electronic information systems for high frequency, high stability, and low phase noise frequency signals.

Therefore, there is an urgent need for a frequency synthesis technology with high frequency, high stability and low phase noise.

SUMMARY

The disclosure provides a microwave photon frequency synthesis system and method to provide frequency signals with high frequency, high stability and low phase noise.

The disclosure provides a microwave photon frequency synthesis system, including:
  an optical frequency comb module, configured to generate a first optical signal;
  an optical frequency multiplication/division module, an input end of the optical frequency multiplication/division module being optically connected with an output end of the optical frequency comb module, and configured to perform frequency multiplication or frequency division processing on a repetition frequency of the first optical signal to obtain and output a second optical signal;
  a first optical routing module, an input end of the first optical routing module being optically connected with an output end of the optical frequency multiplication/division module, and configured to switch and select an optical path;
  an optical amplitude and phase control module, an optical input end of the optical amplitude and phase control module being optically connected with a first output end of the first optical routing module, and configured to perform amplitude and phase control on an input optical signal;
  a second optical routing module, a first input end of the second optical routing module being optically connected with a second output end of the first optical routing module, and a second input end of the second optical routing module being optically connected with an optical output end of the optical amplitude and phase control module, and configured to switch and select the optical path;
  a photoelectric conversion module, an input end of the photoelectric conversion module being optically connected with an output end of the second optical routing module, and configured to perform a photoelectric conversion of the input optical signal to obtain and output an electrical signal;
  a first electrical filtering module, an input end of the first electrical filtering module being electrically connected with a first output end of the photoelectric conversion module, and configured to perform a filtering and frequency selection processing on an input electrical signal;
  an electrical frequency synthesis module, the input end of the electrical frequency synthesis module being electrically connected with an output end of the first electrical filtering module, and configured to perform an electrical frequency synthesis using the input electrical signal as a clock signal or a local oscillator signal;
  a second electrical filtering module, an input end of the second electrical filtering module being electrically connected with a first output end of the electrical frequency synthesis module, and configured to perform the filtering and frequency selection processing on the input electrical signal;
  a first electrical amplification module, an input end of the first electrical amplification module being electrically connected with an output end of the second electrical filtering module, configured to perform a power amplification processing on the input electrical signal, and outputting a power amplified electrical signal to an electrical input end of the optical amplitude and phase control module;

an electrical routing module, a first input end of the electrical routing module being electrically connected with an second output end of the photoelectric conversion module, and s second input end of the electrical routing module being electrically connected with a second output end of the electrical frequency synthesis module, configured to switch and select the electrical path;

a third electrical filtering module, an input end of the third electrical filtering module being electrically connected with an output end of the electrical routing module, and configured to perform the filtering and frequency selection processing on the input electrical signal; and a second electrical amplification module, an input end of the second electrical amplification module being electrically connected with an output end of the third electrical filtering module, and configured to perform the power amplification processing on the input electrical signal.

In some embodiments, the optical amplitude and phase control module includes at least one of an optical intensity modulator and an optical phase modulator, the optical intensity modulator is configured to control an amplitude of the input optical signal, and the optical phase modulator is configured to adjust a phase of the input optical signal.

In some embodiments, the optical amplitude and phase control module further includes an optical filter or a microwave photon filter, and the optical filter or the microwave photon filter is configured to perform a filtering and frequency selection processing on the input optical signal.

In some embodiments, the electrical frequency synthesis module includes at least one of an electrical mixer, an electrical frequency multiplier, an electrical frequency divider, a direct digital synthesizer and an electrical phase-locked loop.

In some embodiments, the microwave photon frequency synthesis system includes a direct photoelectric conversion mode, an electrical frequency synthesis mode and an optical amplitude and phase control mode.

The disclosure further provides a microwave photon frequency synthesis method, including:

providing the microwave photon frequency synthesis system of any one mentioned above;

generating the first optical signal through the optical frequency comb module;

performing the frequency multiplication or frequency division processing on the first optical signal to obtain the second optical signal through the optical frequency multiplication/division module;

optically connecting the input end of the first optical routing module with the second output end of the first optical routing module, and connecting the first input end of the second optical routing module with the output end of the second optical routing module, so as to transmit the second optical signal to the input end of the photoelectric conversion module;

performing a photoelectric conversion processing on the second optical signal through the photoelectric conversion module to obtain a first electrical signal;

electrically connecting the first input end of the electrical routing module with the output end of the electrical routing module, so as to transmit the first electrical signal to the input end of the third electrical filtering module;

performing the filtering and frequency selection processing on the first electrical signal through the third electrical filtering module to obtain a second electrical signal; and performing the power amplification processing on the second electrical signal through the second electrical amplification module to obtain a target electrical signal.

The disclosure further provides a microwave photon frequency synthesis method, including:

providing the microwave photon frequency synthesis system of any one mentioned above;

generating the first optical signal through the optical frequency comb module;

performing the frequency multiplication or frequency division processing on the first optical signal to obtain the second optical signal through the optical frequency multiplication/division module;

optically connecting the input end of the first optical routing module with the second output end of the first optical routing module, and connecting the first input end of the second optical routing module with the output end of the second optical routing module, so as to transmit the second optical signal to the input end of the photoelectric conversion module;

performing a photoelectric conversion processing on the second optical signal through the photoelectric conversion module to obtain a first electrical signal;

performing the filtering and frequency selection processing on the first electrical signal through the first electrical filtering module to obtain a third electrical signal;

performing the electrical frequency synthesis using the third electrical signal as the clock signal or the local oscillator signal through the electrical frequency synthesis module to obtain a fourth electrical signal;

electrically connecting the second input end of the electrical routing module with the output end of the electrical routing module, so as to transmit the fourth electrical signal to the input end of the third electrical filtering module;

performing the filtering and frequency selection processing on the fourth electrical signal through the third electrical filtering module to obtain a fifth electrical signal; and performing the power amplification processing on the fifth electrical signal through the second electrical amplification module to obtain a target electrical signal.

The disclosure further provides a microwave photon frequency synthesis method, including:

providing the microwave photon frequency synthesis system of any one mentioned above;

generating the first optical signal through the optical frequency comb module;

performing the frequency multiplication or frequency division processing on the first optical signal to obtain the second optical signal through the optical frequency multiplication/division module;

optically connecting the input end of the first optical routing module with a first output end of the first optical routing module, so as to transmit the second optical signal to an optical input end of the optical amplitude and phase control module;

performing the amplitude and phase control on the second optical signal through the optical amplitude and phase control module to obtain a third optical signal;

optically connecting the second input end of the second optical routing module with the output end of the second optical routing module, so as to transmit the third optical signal to the input end of the photoelectric conversion module;

performing a photoelectric conversion processing on the third optical signal through the photoelectric conversion module to obtain a sixth electrical signal;

performing the filtering and frequency selection processing on the sixth electrical signal through the first electrical filtering module to obtain a seventh electrical signal;

performing the electrical frequency synthesis using the seventh electrical signal as the clock signal or the local oscillator signal through the electrical frequency synthesis module to obtain an eighth electrical signal;

performing the filtering and frequency selection processing on the eighth electrical signal through the second electrical filtering module to obtain a ninth electrical signal;

performing the power amplification processing on the ninth electrical signal through the first electrical amplification module to obtain a tenth electrical signal, the tenth electrical signal being connected with an electrical input end of the optical amplitude and phase control module, and under a feedback control of the tenth electrical signal, controlling an amplitude and phase of the second optical signal through the optical amplitude and phase control module;

electrically connecting the first input end of the electrical routing module with the output end of the electrical routing module, so as to transmit the sixth electrical signal to the input end of the third electrical filtering module;

performing the filtering and frequency selection processing on the sixth electrical signal through the third electrical filtering module to obtain an eleventh electrical signal; and performing the power amplification processing on the eleventh electrical signal through the second electrical amplification module to obtain a target electrical signal.

In some embodiments, the optical amplitude and phase control module includes at least one of an optical intensity modulator and an optical phase modulator, and when controlling the amplitude and phase of the input optical signal, an amplitude of the input optical signal is controlled by the optical intensity modulator, a phase of the input optical signal is controlled by the optical phase modulator.

In some embodiments, the optical amplitude and phase control module further includes an optical filter or a microwave photon filter, when controlling an amplitude and phase of the input optical signal, the input optical signal is further filtered and frequency-selected through the optical filter or the microwave photon filter.

As mentioned above, the microwave photon frequency synthesis system and method of the disclosure have at least the following beneficial effects:

Based on various combinations of the path switching options of the first optical routing module, the second optical routing module and the electrical routing module, the microwave photonic frequency synthesis system may be provided with a direct photoelectric conversion mode, an electrical frequency synthesis mode and an optical amplitude-phase control mode, and can obtain a variety of different working bandwidths and meet a variety of different bandwidth, phase noise and stability requirements, and its application range is relatively wide. A frequency selection of first optical signal based on the optical frequency comb module and the frequency multiplication/division selection of the optical frequency multiplication/division module can be freely combined to realize frequency sources of various frequencies, which can easily obtain frequency sources with a high-frequency. Based on the optical frequency comb module to generate the first optical signal, a phase noise can be reduced from a source, and then combined with a structural design of the first electrical filtering module, the second electrical filtering module and the third electrical filtering module, it can further reduce the phase noise generated in the frequency synthesis process. The optical amplitude and phase may be controlled by the optical amplitude and phase control module, which can adjust an amplitude and phase of the optical signal precisely, a bandwidth of the frequency source can be further expanded, a phase noise of final frequency obtained can be reduced, and a stability of the frequency source can be improved.

DETAILED DESCRIPTION

The following describes the implementation of the disclosure through specific embodiments, and those skilled in the art can easily understand other advantages and effects of the disclosure from the content disclosed in this specification. The disclosure may also be implemented or applied through other different specific embodiments. Various details in this specification may also be modified or changed based on different viewpoints and applications without departing from the disclosure.

Please refer to FIG. 1 through FIG. 4. It should be noted that the illustrations provided in this embodiment are only schematically illustrating the basic idea of the disclosure. In the drawings, only the components related to the disclosure are shown rather than drawing according to the number, shape and size of the components in actual implementation. The type, quantity and ratio of each component may be changed at will during its actual implementation, and the layout of the components may also be more complicated. The structures, proportions, sizes, etc. shown in the drawings attached to this specification are only used to cooperate with the content disclosed in the specification for those who are familiar with this technology to understand and read, and are not used to limit the conditions for the implementation of the disclosure, therefore, it has no technical substantive significance, any modification of structure, change of proportional relationship or adjustment of size which should still fall within the scope covered by the technical content disclosed in the disclosure without affecting the effects and objectives that can be produced by the disclosure.

As mentioned above in the background, the inventors found many deficiencies when studying the conventional frequency synthesis technology.

On one hand, the traditional microwave frequency synthesis technology uses a quartz crystal and a dielectric resonant cavity to form a microwave oscillator to generate a low phase noise local oscillator signal, and then performs a frequency synthesis based on the local oscillator signal. Wherein, although a phase noise of a quartz oscillator may reach −160 dBc/Hz or even lower when a frequency deviation is 10 kHz, its output frequency is only tens of MHz; at the same time, a Q value of the dielectric resonant cavity decreases linearly with the increase of the output frequency. Therefore, in order to obtain higher frequency microwave signals, electrical frequency multiplication processing is generally required, but the phase noise will deteriorate logarithmically by 20 times during electrical frequency multiplication, and there is a contradiction between high frequency and low phase noise, which makes it unable to meet needs of the next generation of electronic information systems for high frequency, high stability, and low phase noise frequency signals.

On the other hand, with the rapid development of microwave photonics technology, microwave photon frequency synthesis technology has been provided. A technology of X-band microwave photon frequency synthesis based on optoelectronic oscillator may realize the phase noise of −163 dBc/Hz@6 kHz, and a technology of X-band microwave photon frequency synthesis based on optical frequency comb has realized the phase noise better than −170 dBc/Hz@10 kHz. However, in the above-mentioned microwave photon frequency synthesis technology, due to the limitation of the tuning mechanism, the phase noise and stability of the obtained microwave are far behind the traditional microwave frequency synthesis technology, and still cannot meet the requirements of the next generation of electronic information systems for high frequency, high stability, and low phase noise frequency signals.

Based on this, the disclosure provides a microwave photon frequency synthesis technology based on optical amplitude and phase control: based on various combinations of path switching options of optical routing modules and electrical routing modules, a switching selection of multiple working modes may be realized to meet various requirements of bandwidth, phase noise and stability; based on a free frequency selection of an initial optical signal generated by an optical frequency comb module, and then combined with a frequency multiplication/division processing of the optical frequency multiplication/division module, frequency sources of various frequencies may be freely combined to expand the bandwidth; based on the optical frequency comb module to generate the initial optical signal, the phase noise from the source is reduced, and then the electrical filtering module is combined to further reduce the phase noise generated in a frequency synthesis process; based on the optical amplitude and phase control module, the optical amplitude and phase control is performed to precisely control the amplitude and phase of the optical signal to reduce the phase noise of the frequency source and improve a stability of the frequency source.

Figure 1:
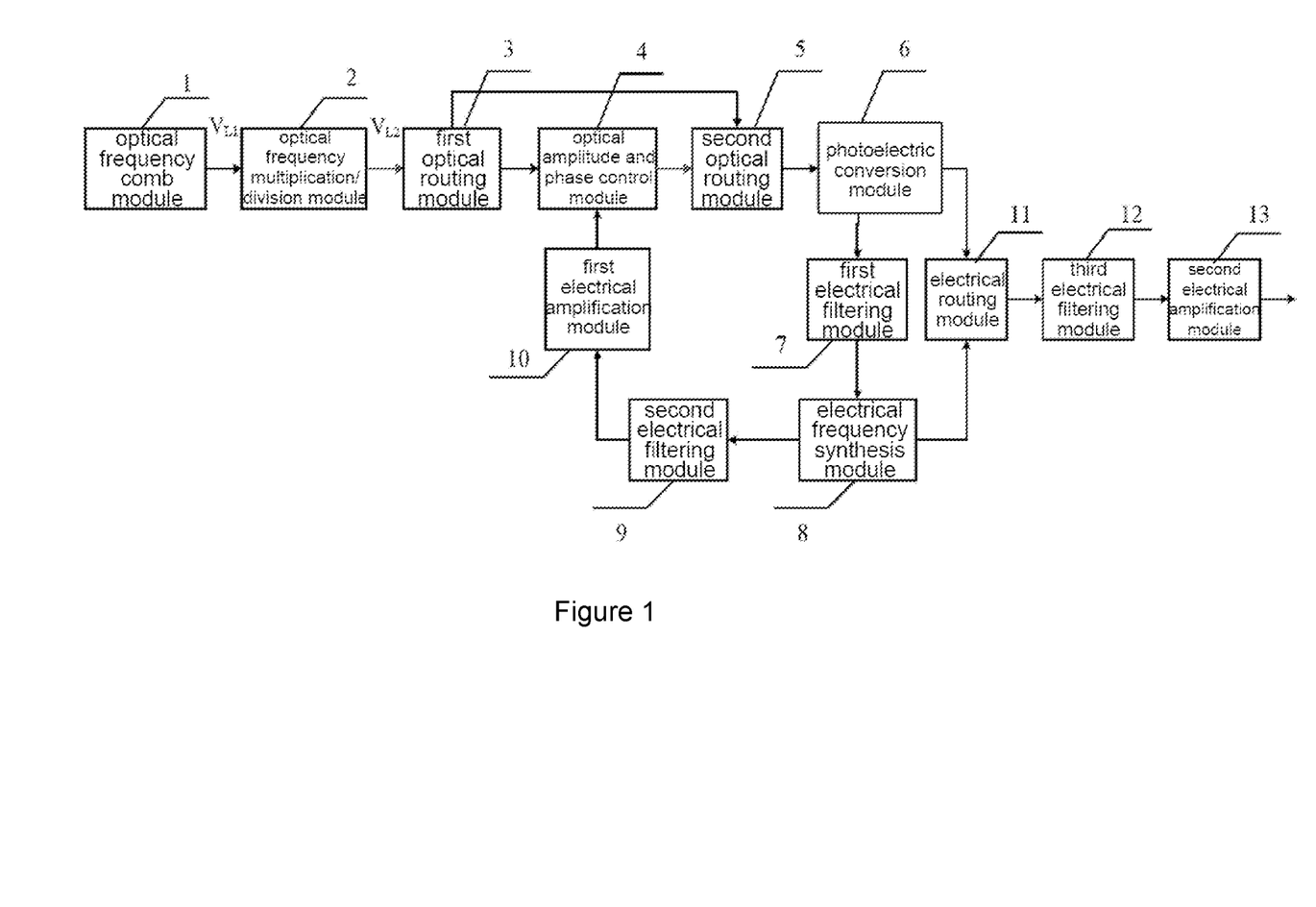
FIG. 1 is a structural block view of a microwave photon frequency synthesis system in the disclosure.

In detail, please refer to FIG. 1, the disclosure provides a microwave photon frequency synthesis system, which includes:

an optical frequency comb module 1, used to generate a first optical signal $V_{L1}$;

an optical frequency multiplication/division module 2, an input end of the optical frequency multiplication/division module 2 being optically connected with an output end of the optical frequency comb module 1, and used to perform frequency multiplication or frequency division processing on a repetition frequency of the first optical signal $V_{L1}$ to obtain and output a second optical signal $V_{L2}$;

a first optical routing module 3, an input end of the first optical routing module 3 being optically connected with an output end of the optical frequency multiplication/division module 2, and used to switch and select an optical path;

an optical amplitude and phase control module 4, an optical input end of the optical amplitude and phase control module 4 being optically connected with a first output end of the first optical routing module 3, and used to perform amplitude and phase control on an input optical signal;

a second optical routing module 5, a first input end of the second optical routing module 5 being optically connected with a second output end of the first optical routing module 3, and a second input end of the second optical routing module 5 being optically connected with an optical output end of the optical amplitude and phase control module 4, and used to switch and select the optical path;

a photoelectric conversion module 6, an input end of the photoelectric conversion module 6 being optically connected with an output end of the second optical routing module 5, and used to perform a photoelectric conversion of the input optical signal to obtain and output an electrical signal;

a first electrical filtering module 7, an input end of the first electrical filtering module 7 being electrically connected with a first output end of the photoelectric conversion module 6, and used to perform a filtering and frequency selection processing on the input electrical signal;

an electrical frequency synthesis module 8, the input end of the electrical frequency synthesis module 8 being electrically connected with an output end of the first electrical filtering module 7, and used to perform an electrical frequency synthesis using the input electrical signal as a local oscillator signal;

a second electrical filtering module 9, an input end of the second electrical filtering module 9 being electrically connected with a first output end of the electrical frequency synthesis module 8, and used to perform the filtering and frequency selection processing on the input electrical signal;

a first electrical amplification module 10, an input end of the first electrical amplification module 10 being electrically connected with the output end of the second electrical filtering module 9, used to perform a power amplification processing on the input electrical signal, and outputting a power amplified electrical signal to an electrical input end of the optical amplitude and phase control module 4;

an electrical routing module 11, a first input end of the electrical routing module 11 being electrically connected with the second output end of the photoelectric conversion module 6, and s second input end of the electrical routing module 11 being electrically connected with a second output end of the electrical frequency synthesis module 8, to switch and select the electrical path;

a third electrical filtering module 12, the input end of the third electrical filtering module 12 being electrically connected with an output end of the electrical routing module 11, and used to perform the filtering and frequency selection processing on the input electrical signal; and a second electrical amplification module 13, an input end of the second electrical amplification module 13 being electrically connected with an output end of the third electrical filtering module 12, and used to perform the power amplification processing on the input electrical signal.

In an embodiment of the disclosure, the optical amplitude and phase control module 4 includes at least one of an optical intensity modulator and an optical phase modulator, the optical intensity modulator is configured to control an amplitude of the input optical signal, and the optical phase modulator is configured to adjust a phase of the input optical signal.

In an embodiment of the disclosure, the optical amplitude and phase control module 4 further includes an optical filter or a microwave photon filter, and the optical filter or the microwave photon filter is configured to perform a filtering and frequency selection processing on the input electrical signal.

Wherein, the electrical frequency synthesis module 8 includes at least one of an electrical mixer, an electrical frequency multiplier, an electrical frequency divider, a direct digital synthesizer, and an electrical phase-locked loop, for synthesizing a new electrical signal according to two electrical signals, which is not limited here.

In more detail, please refer to FIG. 1. Based on various combinations of path switching options of the first optical routing module 3, the second optical routing module 5 and the electrical routing module 11, the microwave photonic frequency synthesis system may include three different working modes: a direct photoelectric conversion mode, an electrical frequency synthesis mode and an optical amplitude and phase control mode.

Figure 2:
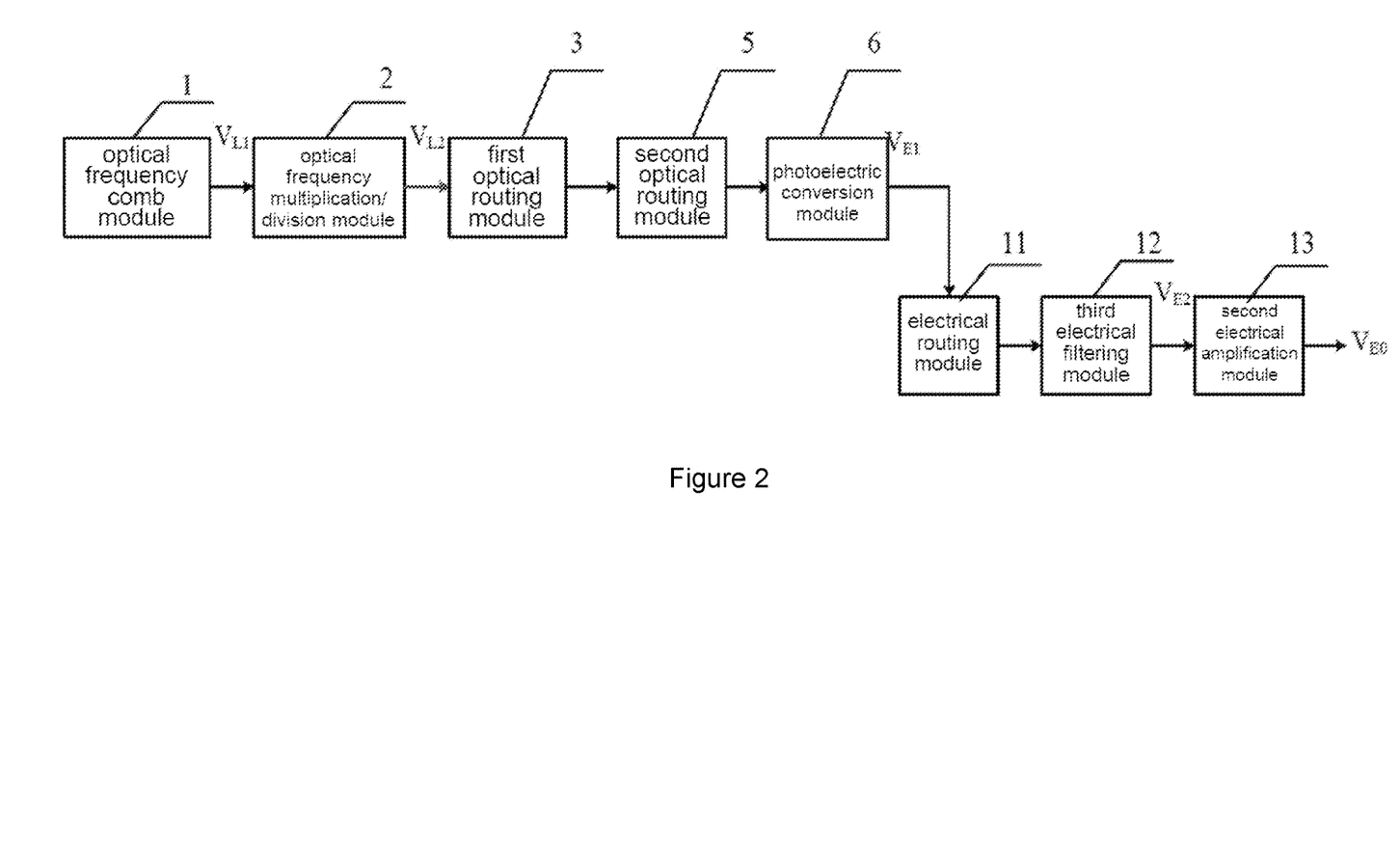
FIG. 2 is a working flowchart of the microwave photon frequency synthesis system in FIG. 1 in a direct photoelectric conversion mode.

In more detail, please refer to FIG. 2. When the first optical routing module 3 is switched to be optically connected with the second optical routing module 5 and the electrical routing module 11 is switched to be electrically connected with the photoelectric conversion module 6, the microwave photon frequency synthesis system is in the direct photoelectric conversion mode: the optical frequency comb module 1 generates the first optical signal $V_{L1}$, the optical frequency multiplication/division module 2 performs the frequency multiplication or frequency division processing on the first optical signal $V_{L1}$ to obtain the second optical signal $V_{L2}$, the second optical signal $V_{L2}$ passes through the first optical routing module 3 and the second optical routing module 5 and is transmitted to the photoelectric conversion module 6, the photoelectric conversion module 6 performs a photoelectric conversion processing on the second optical signal $V_{L2}$ to obtain the first electrical signal $V_{E1}$, and the first electrical signal $V_{E1}$ passes through the electrical routing module 11 and then is transmitted to the third electrical filtering module 12, the third electrical filtering module 12 performs a filtering and frequency selection processing on the first electrical signal $V_{E1}$ to obtain the second electrical signal $V_{E2}$, and the second electrical amplification module 13 performs a power amplification processing on the second electrical signal $V_{E2}$ to obtain a target electrical signal $V_{E0}$.

In an embodiment of the disclosure, in the direct photoelectric conversion mode, the first optical signal $V_{L1}$ generated by the optical frequency comb module 1 is a highly stable, with low phase noise and repetition frequency narrow optical pulse signal of 200 MHz. After performing an 8-fold frequency multiplication processing by the optical frequency multiplication/division module 2 on the first optical signal $V_{L1}$, the obtained second optical signal $V_{L2}$ is a repetition frequency narrow optical pulse signal of 1.6 GHz. The photoelectric conversion module 6 performs the photoelectric conversion processing, and the obtained first electrical signal $V_{E1}$ is an electrical pulse signal of 1.6 GHz, the third electrical filtering module 12 selects the electrical pulse signal of 1.6 GHz, and the second electrical amplification module 13 performs the power amplification processing on the electrical pulse signal of 1.6 GHz to obtain the target electrical signal $V_{E0}$ of 1.6 GHz.

Figure 3:
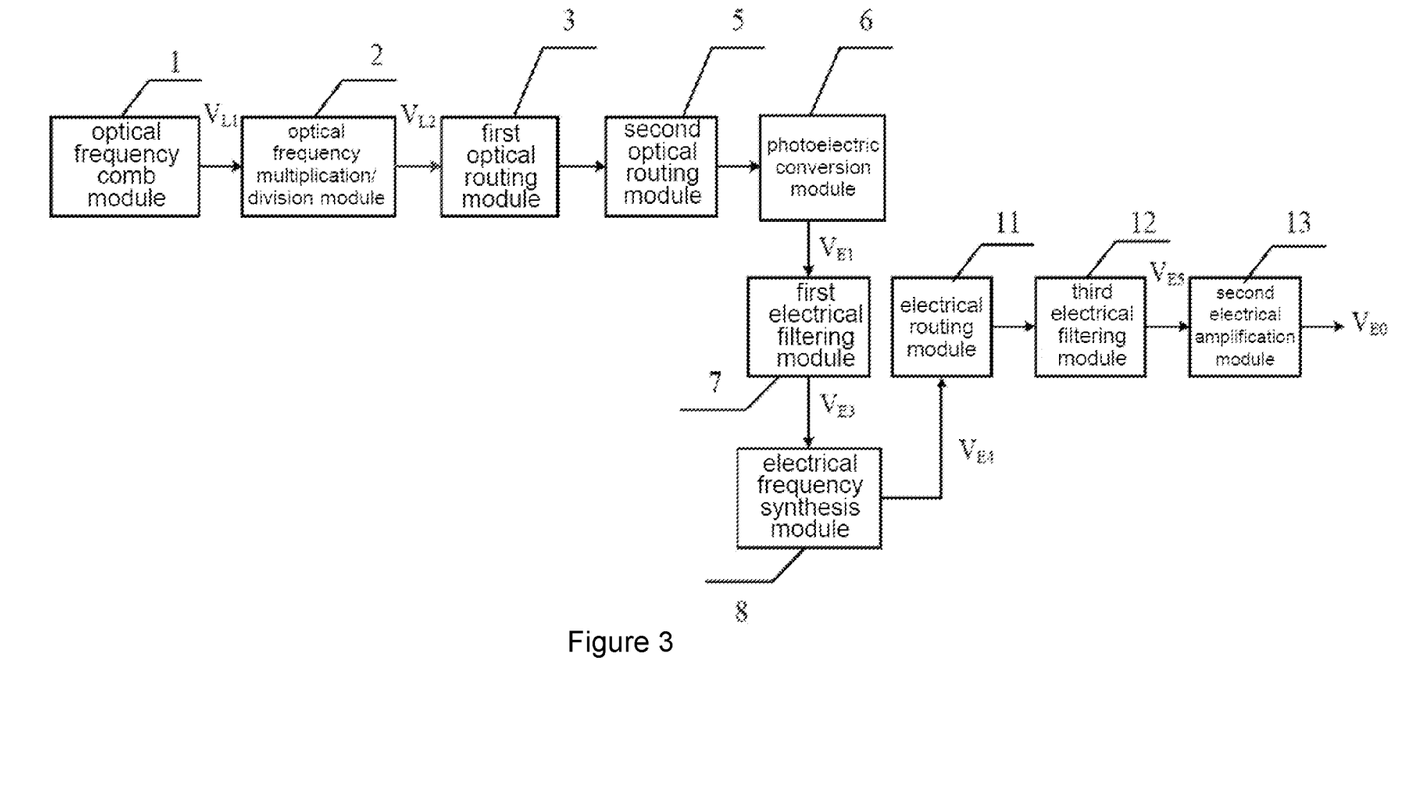
FIG. 3 is a working flowchart of the microwave photon frequency synthesis system in FIG. 1 in an electrical frequency synthesis mode.

In more detail, please refer to FIG. 3. When the first optical routing module 3 is switched to be optically connected with the second optical routing module 5 and the electrical routing module 11 is switched to be electrically connected with the electrical frequency synthesis module 8, the microwave photon frequency synthesis system is in the electrical frequency synthesis mode: the optical frequency comb module 1 generates the first optical signal $V_{L1}$, the optical frequency multiplication/division module 2 performs the frequency multiplication or frequency division processing on the first optical signal $V_{L1}$ to obtain the second optical signal $V_{L2}$, the second optical signal $V_{L2}$ passes through the first optical routing module 3 and the second optical routing module 5 and is transmitted to the photoelectric conversion module 6, the photoelectric conversion module 6 performs a photoelectric conversion processing on the second optical signal $V_{L2}$ to obtain the first electrical signal $V_{E1}$, the first electrical filtering module 7 performs the filtering and frequency selection processing on the first electrical signal $V_{E1}$ to obtain a third electrical signal $V_{E3}$, the electrical frequency synthesis module 8 uses the third electrical signal $V_{E3}$ as the clock signal or the local oscillator signal to perform the electrical frequency synthesis to obtain a fourth electrical signal $V_{E4}$, the fourth electrical signal $V_{E4}$ is transmitted to the third electrical filtering module 12 after passing through the electrical routing module 11, the third electrical filtering module 12 performs the filtering and frequency selection processing on the fourth electrical signal $V_{E4}$ to obtain a fifth electrical signal $V_{E5}$, and the second electrical amplification module 13 performs the power amplification processing on the fifth electrical signal $V_{E5}$ to obtain the target electrical signal $V_{E0}$.

In an embodiment of the disclosure, in the electrical frequency synthesis mode, the first optical signal $V_{L1}$ generated by the optical frequency comb module 1 is a highly stable, with low phase noise and repetition frequency narrow optical pulse signal of 250 MHz. After performing a 4-fold frequency multiplication processing by the optical frequency multiplication/division module 2 on the first optical signal $V_{L1}$, the obtained second optical signal $V_{L2}$ is a repetition frequency narrow optical pulse signal of 1.0 GHz. The photoelectric conversion module 6 performs the photoelectric conversion processing, and the obtained first electrical signal $V_{E1}$ is an electrical pulse signal of 1.0 GHz, the first electrical filtering module 7 selects a frequency signal of 1.0 GHz as the local oscillator signal, the electrical frequency synthesis module 8 generates and synthesizes the fourth electrical signal $V_{E4}$ of 700 MHz according to the input local oscillator signal of 1.0 GHz, the third electrical filtering module 12 selects the electrical pulse signal of 700 MHz, and the second electrical amplification module 13 performs the power amplification processing on the electrical pulse signal of 700 MHz to obtain the target electrical signal $V_{E0}$ of 700 MHz.

Figure 4:
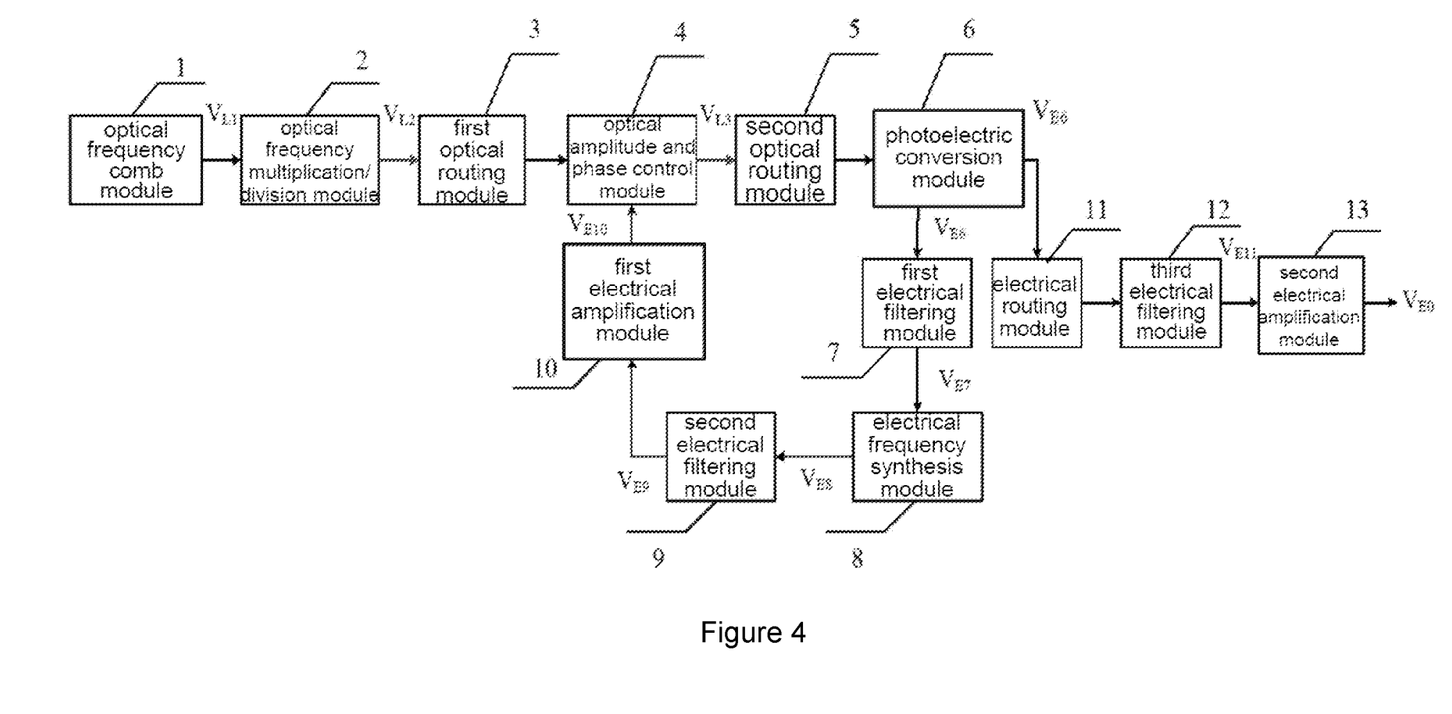
FIG. 4 is a working flowchart of the microwave photon frequency synthesis system in FIG. 1 in an optical amplitude-phase control mode.

In more detail, please refer to FIG. 4. When the first optical routing module 3 is switched to be optically connected with the optical amplitude and phase control module 4, the optical amplitude and phase control module 4 is switched to be optically connected with the second optical routing module 5, and the electrical routing module 11 is switched to be electrically connected with the photoelectric conversion module 6, the microwave photon frequency synthesis system is in the optical amplitude and phase control mode: the optical frequency comb module 1 generates the first optical signal $V_{L1}$, the optical frequency multiplication/division module 2 performs the frequency multiplication or frequency division processing on the first optical signal $V_{L1}$ to obtain the second optical signal $V_{L2}$, the optical amplitude and phase control module 4 performs the amplitude and phase control on the second optical signal $V_{L2}$ to obtain a third optical signal $V_{L3}$, and the third optical signal $V_{L3}$ is transmitted to the photoelectric conversion module 6 after passing through the second optical routing module 5, and the photoelectric conversion module 6 performs the photoelectric conversion processing on the third optical signal $V_{L3}$ to obtain a sixth electrical signal $V_{E6}$. The sixth electrical signal $V_{E6}$ is divided into two channels. In one channel, the first electrical filtering module 7 performs the filtering and frequency selection processing on the sixth electrical signal $V_{E6}$ to obtain a seventh electrical signal $V_{E7}$, the electrical frequency synthesis module 8 uses the seventh electrical signal $V_{E7}$ as the local oscillator signal to perform the electrical frequency synthesis to obtain an eighth electrical signal $V_{E8}$, the second electrical filtering module 9 performs the filtering and frequency selection processing on the eighth electrical signal $V_{E8}$ to obtain a ninth electrical signal $V_{E9}$, the first electrical amplification module 10 performs the power amplification processing on the ninth electrical signal $V_{E9}$ to obtain a tenth electrical signal $V_{E10}$, the tenth electrical signal $V_{E10}$ is connected with the electrical input end of the optical amplitude and phase control module 4, and under a feedback control of the tenth electrical signal $V_{E10}$, an amplitude and phase of the second optical signal $V_{L2}$ is controlled through the optical amplitude and phase control module 4. In the other channel, the sixth electrical signal $V_{E6}$ is transmitted to the third electrical filtering module 12 after passing through the electrical routing module 11, the third electrical filtering module 12 performs the filtering and frequency selection processing on the sixth electrical signal $V_{E6}$ to obtain an eleventh electrical signal $V_{E11}$, and the second electrical amplification module 13 performs the power amplification processing on the eleventh electrical signal $V_{E11}$ to obtain the target electrical signal $V_{E0}$.

In an embodiment of the disclosure, in the optical amplitude and phase control mode, the first optical signal $V_{L1}$ generated by the optical frequency comb module 1 is a highly stable, with low phase noise and repetition frequency narrow optical pulse signal of 250 MHz. After performing an 8-fold frequency multiplication processing by the optical frequency multiplication/division module 2 on the first optical signal $V_{L1}$, the obtained second optical signal $V_{L2}$ is a repetition frequency narrow optical pulse signal of 2.0 GHz. The optical amplitude and phase control module 4 performs the amplitude and phase control on the second optical signal $V_{L2}$ to obtain the third optical signal $V_{L3}$, the photoelectric conversion module 6 performs the photoelectric conversion processing on the third optical signal $V_{L3}$ to obtain the sixth electrical signal $V_{E6}$, the sixth electrical signal $V_{E6}$ is divided into two channels, one channel of the sixth electrical signal $V_{E6}$ passes through the first electrical filtering module 7 to extract the local oscillator signal of 2.0 GHz, the electrical frequency synthesis module 8 generates and synthesizes the eighth electrical signal $V_{E8}$ of 300 MHz according to the input local oscillator signal of 2.0 GHz, and the eighth electrical signal $V_{E8}$ is filtered by the second electrical filtering module 9 and amplified by the first electrical amplification module 10 to drive the optical amplitude and phase control module 4. And the other channel of the sixth electrical signal $V_{E6}$ is transmitted to the third electrical filtering module 12 after passing through the electrical routing module 11, the third electrical filtering module 12 performs the filtering and frequency selection processing on the sixth electrical signal $V_{E6}$ to obtain the eleventh electrical signal $V_{E11}$ of 9.7 GHz, and the second electrical amplification module 13 performs the power amplification processing on the eleventh electrical signal $V_{E11}$ to obtain the target electrical signal $V_{E0}$ of 9.7 GHz.

From the above analysis, it may be seen that based on various combinations of the path switching options of the first optical routing module 3, the second optical routing module 5 and the electrical routing module 11, the microwave photonic frequency synthesis system may be provided with a direct photoelectric conversion mode, an electrical frequency synthesis mode and an optical amplitude-phase control mode, and can obtain a variety of different working bandwidths and meet a variety of different bandwidth, phase noise and stability requirements, and its application range is relatively wide; a frequency selection of first optical signal based on the optical frequency comb module 1 and the frequency multiplication/division selection of the optical frequency multiplication/division module 2 can be freely combined to realize frequency sources of various frequencies, which can easily obtain frequency sources with a high-frequency (which means the target electrical signal); based on the optical frequency comb module 1 to generate the first optical signal, a phase noise can be reduced from a source, and then combined with a structural design of the first electrical filtering module 7, the second electrical filtering module 9 and the third electrical filtering module 12, it can further reduce the phase noise generated in the frequency synthesis process; the optical amplitude and phase may be controlled by the optical amplitude and phase control module 4, which can adjust an amplitude and phase of the optical signal precisely, a bandwidth of the frequency source can be further expanded, a final frequency phase noise can be reduced, and a stability of the frequency source can be improved.

In addition, based on the direct photoelectric conversion mode of the above-mentioned microwave photon frequency synthesis system, the disclosure further provides a microwave photon frequency synthesis method, including:

S1: providing the microwave photon frequency synthesis system of any one mentioned above;

S2: generating the first optical signal $V_{L1}$ through the optical frequency comb module 1;

S3: performing the frequency multiplication or frequency division processing on the first optical signal $V_{L1}$ to obtain and output the second optical signal $V_{L2}$ through the optical frequency multiplication/division module 2;

S4: optically connecting the input end of the first optical routing module 3 with the second output end of the first optical routing module 3, and connecting the first input end of the second optical routing module 5 with the output end of the second optical routing module 5, so as to transmit the second optical signal $V_{L2}$ to the input end of the photoelectric conversion module 6;

S5: performing a photoelectric conversion processing on the second optical signal $V_{L2}$ through the photoelectric conversion module 6 to obtain a first electrical signal $V_{E1}$;

S6: electrically connecting the first input end of the electrical routing module 11 with the output end of the electrical routing module 11, so as to transmit the first electrical signal $V_{E1}$ to the input end of the third electrical filtering module 12;

S7: performing the filtering and frequency selection processing on the first electrical signal $V_{E1}$ through the third electrical filtering module 12 to obtain a second electrical signal $V_{E2}$; and S8: performing the power amplification processing on the second electrical signal $V_{E2}$ through the second electrical amplification module 13 to obtain a target electrical signal $V_{E0}$.

Wherein, a specific flow of the above-mentioned microwave photon frequency synthesis method may refer to FIG. 2, which will not be repeated here.

Based on the electrical frequency synthesis mode, the disclosure further provides a microwave photon frequency synthesis method, including:

St1: providing the microwave photon frequency synthesis system of any one mentioned above;

St2: generating the first optical signal $V_{L2}$ through the optical frequency comb module 1;

St3: performing the frequency multiplication or frequency division processing on the first optical signal $V_{L1}$ to obtain the second optical signal $V_{L2}$ through the optical frequency multiplication/division module 2;

St4: optically connecting the input end of the first optical routing module 3 with the second output end of the first optical routing module 3, and connecting the first input end of the second optical routing module 5 with the output end of the second optical routing module 5, so as to transmit the second optical signal $V_{L2}$ to the input end of the photoelectric conversion module 6;

St5: performing a photoelectric conversion processing on the second optical signal $V_{L2}$ through the photoelectric conversion module 6 to obtain a first electrical signal $V_{E1}$;

St6: performing the filtering and frequency selection processing on the first electrical signal $V_{E1}$ through the first electrical filtering module 7 to obtain a third electrical signal $V_{E3}$;

St7: performing the electrical frequency synthesis using the third electrical signal $V_{E3}$ as the clock signal or the local oscillator signal through the electrical frequency synthesis module 8 to obtain a fourth electrical signal $V_{E4}$;

St8: electrically connecting the second input end of the electrical routing module 11 with the output end of the electrical routing module 11, so as to transmit the fourth electrical signal $V_{E4}$ to the input end of the third electrical filtering module 12;

St9: performing the filtering and frequency selection processing on the fourth electrical signal $V_{E4}$ through the third electrical filtering module 12 to obtain a fifth electrical signal $V_{E5}$; and St10: performing the power amplification processing on the fifth electrical signal $V_{E5}$ through the second electrical amplification module 13 to obtain a target electrical signal $V_{E0}$.

Wherein, a specific flow of the above-mentioned microwave photon frequency synthesis method may refer to FIG. 3, which will not be repeated here.

Based on the optical amplitude-phase control mode, the disclosure further provides a microwave photon frequency synthesis method, including:

Stp1: providing the microwave photon frequency synthesis system of any one mentioned above;

Stp2: generating the first optical signal $V_{L1}$ through the optical frequency comb module 1;

Stp3: performing the frequency multiplication or frequency division processing on the first optical signal $V_{L1}$ to obtain the second optical signal $V_{L2}$ through the optical frequency multiplication/division module 2;

Stp4: optically connecting the input end of the first optical routing module 3 with a first output end of the first optical routing module 3, so as to transmit the second optical signal $V_{L2}$ to an optical input end of the optical amplitude and phase control module 4;

Stp5: performing the amplitude and phase control on the second optical signal $V_{L2}$ through the optical amplitude and phase control module 4 to obtain a third optical signal $V_{L3}$;

Stp6: optically connecting the second input end of the second optical routing module 5 with the output end of the second optical routing module 5, so as to transmit the third optical signal $V_{L3}$ to the input end of the photoelectric conversion module 6;

Stp7: performing a photoelectric conversion processing on the third optical signal $V_{L3}$ through the photoelectric conversion module 6 to obtain a sixth electrical signal $V_{E6}$;

Stp8: performing the filtering and frequency selection processing on the sixth electrical signal $V_{E6}$ through the first electrical filtering module 7 to obtain a seventh electrical signal $V_{E7}$;

Stp9: performing the electrical frequency synthesis using the seventh electrical signal $V_{E7}$ as the clock signal or the local oscillator signal through the electrical frequency synthesis module 8 to obtain an eighth electrical signal $V_{E8}$;

Stp10: performing the filtering and frequency selection processing on the eighth electrical signal $V_{E8}$ through the second electrical filtering module 9 to obtain a ninth electrical signal $V_{E9}$;

Stp11: performing the power amplification processing on the ninth electrical signal $V_{E9}$ through the first electrical amplification module 10 to obtain a tenth electrical signal $V_{E10}$, the tenth electrical signal $V_{E10}$ being connected with an electrical input end of the optical amplitude and phase control module 4, and under a feedback control of the tenth electrical signal $V_{E10}$, controlling an amplitude and phase of the second optical signal $V_{L2}$ through the optical amplitude and phase control module 4;

Stp12: electrically connecting the first input end of the electrical routing module 11 with the output end of the electrical routing module 11, so as to transmit the sixth electrical signal $V_{E6}$ to the input end of the third electrical filtering module 12;

Stp13: performing the filtering and frequency selection processing on the sixth electrical signal $V_{E6}$ through the third electrical filtering module 12 to obtain an eleventh electrical signal $V_{E11}$; and Stp14: performing the power amplification processing on the eleventh electrical signal $V_{E11}$ through the second electrical amplification module 13 to obtain a target electrical signal $V_{E0}$.

Wherein, a specific flow of the above-mentioned microwave photon frequency synthesis method may refer to FIG. 4, which will not be repeated here.

Wherein, the optical amplitude and phase control module 4 includes at least one of an optical intensity modulator and an optical phase modulator, in the microwave photon frequency synthesis methods above, when controlling the amplitude and phase of the input optical signal, an amplitude of the input optical signal is controlled by the optical intensity modulator, a phase of the input optical signal is controlled by the optical phase modulator; the optical amplitude and phase control module 4 further includes an optical filter or a microwave photon filter, in the microwave photon frequency synthesis methods above, when controlling an amplitude and phase of the input optical signal, the input optical signal is further filtered and frequency-selected through the optical filter or the microwave photon filter.

The above-mentioned embodiments merely illustrate the principles and effects of the disclosure, but are not intended to limit the disclosure. Anyone skilled in the art may modify or change the above embodiments without departing from the range of the disclosure. Therefore, all equivalent modifications or changes made by those with ordinary knowledge in the technical field without departing from the range and technic disclosed in the disclosure should still be covered by the claims of the disclosure.

What is claimed is:

1. A microwave photon frequency synthesis system, comprising:
    an optical frequency comb module, configured to generate a first optical signal;
    an optical frequency multiplication/division module, an input end of the optical frequency multiplication/division module being optically connected with an output end of the optical frequency comb module, and configured to perform frequency multiplication or frequency division processing on a repetition frequency of the first optical signal to obtain and output a second optical signal;
    a first optical routing module, an input end of the first optical routing module being optically connected with an output end of the optical frequency multiplication/division module, and configured to switch and select an optical path;
    an optical amplitude and phase control module, an optical input end of the optical amplitude and phase control module being optically connected with a first output end of the first optical routing module, and configured to perform amplitude and phase control on an input optical signal;
    a second optical routing module, a first input end of the second optical routing module being optically connected with a second output end of the first optical routing module, and a second input end of the second optical routing module being optically connected with an optical output end of the optical amplitude and phase control module, and configured to switch and select the optical path;
    a photoelectric conversion module, an input end of the photoelectric conversion module being optically connected with an output end of the second optical routing module, and configured to perform a photoelectric conversion of the input optical signal to obtain and output an electrical signal;
    a first electrical filtering module, an input end of the first electrical filtering module being electrically connected with a first output end of the photoelectric conversion module, and configured to perform a filtering and frequency selection processing on an input electrical signal;
    an electrical frequency synthesis module, an input end of the electrical frequency synthesis module being electrically connected with an output end of the first electrical filtering module, and configured to perform an electrical frequency synthesis using the input electrical signal as a clock signal or a local oscillator signal;
    a second electrical filtering module, an input end of the second electrical filtering module being electrically connected with a first output end of the electrical frequency synthesis module, and configured to perform the filtering and frequency selection processing on the input electrical signal;
    a first electrical amplification module, an input end of the first electrical amplification module being electrically connected with an output end of the second electrical filtering module, configured to perform a power amplification processing on the input electrical signal, and outputting a power amplified electrical signal to an electrical input end of the optical amplitude and phase control module;
    an electrical routing module, a first input end of the electrical routing module being electrically connected with an second output end of the photoelectric conversion module, and s second input end of the electrical routing module being electrically connected with a second output end of the electrical frequency synthesis module, configured to switch and select the electrical path;
    a third electrical filtering module, an input end of the third electrical filtering module being electrically connected with an output end of the electrical routing module, and configured to perform the filtering and frequency selection processing on the input electrical signal; and
    a second electrical amplification module, an input end of the second electrical amplification module being electrically connected with an output end of the third electrical filtering module, and configured to perform the power amplification processing on the input electrical signal.

2. The microwave photon frequency synthesis system according to claim 1, wherein
    the optical amplitude and phase control module comprises at least one of an optical intensity modulator and an optical phase modulator, the optical intensity modulator is configured to control an amplitude of the input optical signal, and the optical phase modulator is configured to adjust a phase of the input optical signal.

3. The microwave photon frequency synthesis system according to claim 2, wherein
    the optical amplitude and phase control module further comprises an optical filter or a microwave photon filter, and the optical filter or the microwave photon filter is configured to perform a filtering and frequency selection processing on the input optical signal.

4. The microwave photon frequency synthesis system according to claim 1, wherein
    the electrical frequency synthesis module comprises at least one of an electrical mixer, an electrical frequency multiplier, an electrical frequency divider, a direct digital synthesizer and an electrical phase-locked loop.

5. The microwave photon frequency synthesis system according to claim 1, wherein
    the microwave photon frequency synthesis system comprises a direct photoelectric conversion mode, an electrical frequency synthesis mode and an optical amplitude and phase control mode.

6. A microwave photon frequency synthesis method, comprising:
providing the microwave photon frequency synthesis system according to claim 1;
generating the first optical signal through the optical frequency comb module;
performing the frequency multiplication or frequency division processing on the first optical signal to obtain the second optical signal through the optical frequency multiplication/division module;
optically connecting the input end of the first optical routing module with the second output end of the first optical routing module, and connecting the first input end of the second optical routing module with the output end of the second optical routing module, so as to transmit the second optical signal to the input end of the photoelectric conversion module;
performing a photoelectric conversion processing on the second optical signal through the photoelectric conversion module to obtain a first electrical signal;
electrically connecting the first input end of the electrical routing module with the output end of the electrical routing module, so as to transmit the first electrical signal to the input end of the third electrical filtering module;
performing the filtering and frequency selection processing on the first electrical signal through the third electrical filtering module to obtain a second electrical signal; and
performing the power amplification processing on the second electrical signal through the second electrical amplification module to obtain a target electrical signal.

7. The microwave photon frequency synthesis method according to claim 6, wherein
the optical amplitude and phase control module comprises at least one of an optical intensity modulator and an optical phase modulator, and when controlling the amplitude and phase of the input optical signal, an amplitude of the input optical signal is controlled by the optical intensity modulator, a phase of the input optical signal is controlled by the optical phase modulator.

8. The microwave photon frequency synthesis method according to claim 6, wherein
the optical amplitude and phase control module further comprises an optical filter or a microwave photon filter, when controlling an amplitude and phase of the input optical signal, the input optical signal is further filtered and frequency-selected through the optical filter or the microwave photon filter.

9. A microwave photon frequency synthesis method, comprising:
providing the microwave photon frequency synthesis system according to claim 1;
generating the first optical signal through the optical frequency comb module;
performing the frequency multiplication or frequency division processing on the first optical signal to obtain the second optical signal through the optical frequency multiplication/division module;
optically connecting the input end of the first optical routing module with the second output end of the first optical routing module, and connecting the first input end of the second optical routing module with the output end of the second optical routing module, so as to transmit the second optical signal to the input end of the photoelectric conversion module;
performing a photoelectric conversion processing on the second optical signal through the photoelectric conversion module to obtain a first electrical signal;
performing the filtering and frequency selection processing on the first electrical signal through the first electrical filtering module to obtain a third electrical signal;
performing the electrical frequency synthesis using the third electrical signal as the clock signal or the local oscillator signal through the electrical frequency synthesis module to obtain a fourth electrical signal;
electrically connecting the second input end of the electrical routing module with the output end of the electrical routing module, so as to transmit the fourth electrical signal to the input end of the third electrical filtering module;
performing the filtering and frequency selection processing on the fourth electrical signal through the third electrical filtering module to obtain a fifth electrical signal; and
performing the power amplification processing on the fifth electrical signal through the second electrical amplification module to obtain a target electrical signal.

10. The microwave photon frequency synthesis method according to claim 9, wherein
the optical amplitude and phase control module comprises at least one of an optical intensity modulator and an optical phase modulator, and when controlling the amplitude and phase of the input optical signal, an amplitude of the input optical signal is controlled by the optical intensity modulator, a phase of the input optical signal is controlled by the optical phase modulator.

11. The microwave photon frequency synthesis method according to claim 9, wherein
the optical amplitude and phase control module further comprises an optical filter or a microwave photon filter, when controlling an amplitude and phase of the input optical signal, the input optical signal is further filtered and frequency-selected through the optical filter or the microwave photon filter.

12. A microwave photon frequency synthesis method, comprising:
providing the microwave photon frequency synthesis system according to claim 1;
generating the first optical signal through the optical frequency comb module;
performing the frequency multiplication or frequency division processing on the first optical signal to obtain the second optical signal through the optical frequency multiplication/division module;
optically connecting the input end of the first optical routing module with a first output end of the first optical routing module, so as to transmit the second optical signal to an optical input end of the optical amplitude and phase control module;
performing the amplitude and phase control on the second optical signal through the optical amplitude and phase control module to obtain a third optical signal;
optically connecting the second input end of the second optical routing module with the output end of the second optical routing module, so as to transmit the third optical signal to the input end of the photoelectric conversion module;
performing a photoelectric conversion processing on the third optical signal through the photoelectric conversion module to obtain a sixth electrical signal;

performing the filtering and frequency selection processing on the sixth electrical signal through the first electrical filtering module to obtain a seventh electrical signal;

performing the electrical frequency synthesis using the seventh electrical signal as the clock signal or the local oscillator signal through the electrical frequency synthesis module to obtain an eighth electrical signal;

performing the filtering and frequency selection processing on the eighth electrical signal through the second electrical filtering module to obtain a ninth electrical signal;

performing the power amplification processing on the ninth electrical signal through the first electrical amplification module to obtain a tenth electrical signal, the tenth electrical signal being connected with an electrical input end of the optical amplitude and phase control module, and under a feedback control of the tenth electrical signal, controlling an amplitude and phase of the second optical signal through the optical amplitude and phase control module;

electrically connecting the first input end of the electrical routing module with the output end of the electrical routing module, so as to transmit the sixth electrical signal to the input end of the third electrical filtering module;

performing the filtering and frequency selection processing on the sixth electrical signal through the third electrical filtering module to obtain an eleventh electrical signal; and performing the power amplification processing on the eleventh electrical signal through the second electrical amplification module to obtain a target electrical signal.

13. The microwave photon frequency synthesis method according to claim 12, wherein the optical amplitude and phase control module comprises at least one of an optical intensity modulator and an optical phase modulator, and when controlling the amplitude and phase of the input optical signal, an amplitude of the input optical signal is controlled by the optical intensity modulator, a phase of the input optical signal is controlled by the optical phase modulator.

14. The microwave photon frequency synthesis method according to claim 12, wherein the optical amplitude and phase control module further comprises an optical filter or a microwave photon filter, when controlling an amplitude and phase of the input optical signal, the input optical signal is further filtered and frequency-selected through the optical filter or the microwave photon filter.

* * * * *